(12) United States Patent
Li (10) Patent No.: US 9,982,698 B2
(45) Date of Patent: May 29, 2018

(54) LOCK FIXING MECHANISM WITH QUICK ASSEMBLY AND DISASSEMBLY AND A BOOTH APPLIED WITH THE MECHANISM

(71) Applicant: SUNTOP (XIAMEN) DISPLAY SYSTEM INC., Xiamen (CN)

(72) Inventor: Hongze Li, Xiamen (CN)

(73) Assignee: SUNTOP (XIAMEN) DISPLAY SYSTEM INC., Xiamen (CN)

( * ) Notice: Subject to any disclaimer, the term of this patent is extended or adjusted under 35 U.S.C. 154(b) by 35 days.

(21) Appl. No.: 15/125,804

(22) PCT Filed: Jan. 30, 2015

(86) PCT No.: PCT/CN2015/071883
§ 371 (c)(1),
(2) Date: Sep. 13, 2016

(87) PCT Pub. No.: WO2015/143946
PCT Pub. Date: Oct. 1, 2015

(65) Prior Publication Data
US 2017/0002851 A1   Jan. 5, 2017

(30) Foreign Application Priority Data

Mar. 24, 2014   (CN) .......................... 2014 1 0110617

(51) Int. Cl.
*A47B 13/00*   (2006.01)
*F16B 12/10*   (2006.01)
(Continued)

(52) U.S. Cl.
CPC ................ *F16B 12/10* (2013.01); *A47B 3/06* (2013.01); *A47B 47/00* (2013.01); *A47B 47/005* (2013.01);
(Continued)

(58) Field of Classification Search
CPC .......... F16B 12/10; F16B 12/20; F16B 12/32; F16B 12/40; F16B 12/44; F16B 2012/103;
(Continued)

(56) References Cited

U.S. PATENT DOCUMENTS 2,762,639 A * 9/1956 Molter ............... A47B 47/0008
256/65.08
3,272,582 A * 9/1966 Mack ................. A47B 47/0008
108/59

(Continued)

FOREIGN PATENT DOCUMENTS

| CN | 1746519 A | 3/2006 |
|---|---|---|
| CN | 201027742 Y | 2/2008 |
| CN | 201437808 U | 4/2010 |
| CN | 103925271 A | 7/2014 |
| CN | 203847523 U | 9/2014 |

*Primary Examiner* — Daniel J Troy
*Assistant Examiner* — Timothy M Ayres
(74) *Attorney, Agent, or Firm* — Rabin & Berdo, P.C.

(57) ABSTRACT

The present invention is provided with a lock fixing mechanism with quick assembly and disassembly, with a position lock block coupled to a position lock bar, the position lock block is contacted with the side surface of the position lock bar, by rotating, the position lock block squeezes the position lock bar. Under the action of the pressure, the spring connected to the position lock block deforms that the position lock bar moves towards the deforming direction of the spring, therefore the position lock bar is locked between the position lock block. The entire device doesn't need additional components nor need professional to operate that it has well applicability. The present invention further provides with a booth applied with the lock fixing mechanism with quick assembly and disassembly.

25 Claims, 5 Drawing Sheets

(51) Int. Cl.
*A47B 3/06* (2006.01)
*A47B 47/00* (2006.01)
*F16B 12/20* (2006.01)
*F16B 12/32* (2006.01)
*F16B 12/40* (2006.01)

(52) U.S. Cl.
CPC .......... *A47B 47/0016* (2013.01); *F16B 12/20* (2013.01); *F16B 12/32* (2013.01); *F16B 12/40* (2013.01); *F16B 2012/103* (2013.01)

(58) Field of Classification Search
CPC .... F16B 2012/446; F16B 7/0446; A47B 3/06; A47B 47/00; A47B 47/0016; A47B 47/005; A47B 47/0008; A47B 95/00
USPC ...................................................... 108/157.1
See application file for complete search history.

(56) References Cited

U.S. PATENT DOCUMENTS

| | | | | |
|---|---|---|---|---|
| 3,532,369 | A * | 10/1970 | Reilly | E04B 1/5831 403/176 |
| 3,780,386 | A | 12/1973 | Fouks et al. | |
| 4,072,432 | A * | 2/1978 | Levy | F16B 7/0446 403/170 |
| 4,714,370 | A * | 12/1987 | Chen | A47B 47/0008 403/171 |
| 8,192,105 | B2 * | 6/2012 | Keyvanloo | A47B 47/0016 403/171 |
| 9,458,874 | B2 * | 10/2016 | Sim | E04B 1/5831 |
| 2016/0010675 | A1 * | 1/2016 | Chu | F16B 12/32 403/296 |

* cited by examiner

LOCK FIXING MECHANISM WITH QUICK ASSEMBLY AND DISASSEMBLY AND A BOOTH APPLIED WITH THE MECHANISM

FIELD OF THE INVENTION

The present invention relates to a connecting fixing device, especially to a lock fixing mechanism with quick assembly and disassembly and a booth applied with the mechanism.

BACKGROUND OF THE INVENTION

Traditional good shelf and booth are composed of lateral pipes and longitudinal pipes, it usually applies lap joints or screws to connect the pipes, the assembly method is complicated, it needs additional tools to assemble, it is also complicated to disassemble, it also needs professional to operate that it is of time waste and labor waste.

SUMMARY OF THE INVENTION

The main object of the present invention is to provide with a lock fixing mechanism that can be disassembled and assembled quickly, it doesn't need additional tool to assemble and disassemble, it is convenient and fast.

The second object of the present invention is to provide with a booth applied with above lock fixing mechanism.

The technical proposal of the present invention is that: A lock fixing mechanism with quick assembly and disassembly, comprising:
a lock fixing mechanism main body, the main body is disposed with a front end portion and a first boss; a chamber is formed between the front end portion and the first boss; a position lock block, the position lock block is disposed in the chamber; the thickness of the position lock block along the arrangement direction of the front end portion and the first boss is smaller than the depth of the chamber along the arrangement direction of the front end portion and the first boss; the position lock block is disposed with a first groove at the side near the first boss; an elastic device, the elastic device is disposed at one side of the position lock block near the front end portion;
a lock fixing connector, the lock fixing connector is disposed with a first position lock bar at the inner side, the first position lock bar is disposed with a first lock fixing component at one side away from the first boss along the assembly direction; the first position lock bar is disposed with a first lock groove at one side away from the first lock fixing component;
the length of the first lock fixing component along the arrangement direction of the front end portion and the first boss is larger than the distance between the position lock block and the first boss in normal state; the length of the first lock fixing component along the arrangement direction of the front end portion and the first boss is smaller than the distance between the position lock block and the first boss when the elastic device is compressed to the shortest;
the lock fixing connector is sleeved on the lock fixing mechanism main body, the first lock fixing component is contacted with the outer side of the position lock block; when the lock fixing connector rotates, the first lock fixing component squeezes the position lock block, the elastic device is compressed, the position lock block moves towards the deforming direction of the elastic device; when the first lock fixing component is coincided with the first groove, the position lock block rebounds by the elastic device, making the first lock fixing component locked to the first groove; at the same time, the first lock groove is locked to the upper half portion of the first boss.

In another preferred embodiment, the front end portion is a second boss with same size and same shape as the first boss.

In another preferred embodiment, the section of the first boss vertical to the assembly direction is rhombus shaped.

In another preferred embodiment, the section of the internal surface of the movable connecting pipe vertical to the assembly direction is rectangle shaped, the long side of the rectangle is corresponding to the long axis of the rhombus, the short side of the rectangle is corresponding to the short axis of the rhombus.

In another preferred embodiment, the first groove is an incline groove bar with height difference. In another preferred embodiment, one side of the position lock block near the first boss is further disposed with a second groove with same shape and same size as the first groove; the second groove and the first groove are symmetrical about the center.

In another preferred embodiment, one side of the position lock block near the first boss is further disposed with a third groove and a fourth groove, the third groove and the first groove are symmetrically arranged in the longitudinal direction; the fourth groove and the second groove are symmetrically arranged in the longitudinal direction.

In another preferred embodiment, one end of the first groove away from the first lock fixing component is further disposed with a first guiding block.

In another preferred embodiment, the internal portion of the movable connector is further disposed with a second position lock bar, the second position lock bar has same size and same shape as the first position lock bar and is assembled in the same longitudinal plane symmetrical to the first position lock bar about the center.

In another preferred embodiment, a first guiding device is further disposed between the position lock block and the first boss, the first guiding device is fixed to the first boss.

In another preferred embodiment, the lock fixing mechanism main body is further disposed with a third boss, the third boss if connected to the central portion of a side surface of the first boss; a second guiding device is disposed between the third boss and the first boss.

In another preferred embodiment, the position lock block and the elastic device is connected between the front end portion and the first guiding device via a screw.

In another preferred embodiment, the lock fixing mechanism is fixed to a base.

A booth with the lock fixing mechanism with quick assembly and disassembly, comprising the lock fixing connector and a connecting frame; the booth comprises two connecting frames arranged in the opposite direction, the lock fixing mechanism main body is welded to the corresponding position of the two connecting frames; two ends of the lock fixing connector are respectively fixed with the first position lock bar.

In another preferred embodiment, the booth further comprises a glass tabletop, the glass table top is disposed in the booth.

A booth with the lock fixing mechanism with quick assembly and disassembly

A lock fixing method applied with the lock fixing mechanism according to claim 1, wherein comprising:
1) a fixing portion is disposed with a movable element, a deformable elastic device is disposed between the movable element and the fixing portion; the movable element is disposed with a lock fixing groove;

2) a connecting element is disposed, the internal portion of the connecting element is disposed with a lock fixing device corresponding to the lock fixing groove;

3) the connecting element is sleeved on the fixing portion, the lock fixing device is contacted with the outer side of the movable element;

4) rotating the connecting element to make the lock fixing device squeezes the movable element to push the movable element to move, when the lock fixing device rotates to a position coincided with the lock fixing groove, the movable element rebounds by the spring device, the lock fixing is finished;

5) when the lock fixing device is to be disassembled, rotating the connecting element reversely. Compared to the existing known technology, the technical proposal of the present invention has advantages:

1. The present invention is provided with a lock fixing device with quick assembly and disassembly, when to assemble, it just needs to make the movable connector sleeved on the lock fixing mechanism main body and then rotated that it can achieve the connecting of the lateral pipe and the longitudinal pipe. When to disassemble, it just needs to rotate the movable connector reversely. It doesn't need professional nor additional tools.

2. The lock fixing device with quick assembly and disassembly of the present invention is provided that the section of the main body is rhombus shaped, the section of the movable connector is rectangle shaped. After the lock steps, four vertexes of the rhombus abut against four sides of the rectangle, it is stable and reliable.

3. The lock fixing device with quick assembly and disassembly of the present invention is provided that the position lock bar is disposed with groove, so that after the lock step, the groove of the position lock bar is locked to the second boss, it improves the stability of the entire device.

4. The lock fixing device with quick assembly and disassembly of the present invention is provided that with the guiding device and the guiding block, and the movable connector is sleeved on the main body, the motion is smooth.

DETAILED DESCRIPTION OF THE EMBODIMENTS

The present invention will be further described with the drawings and the embodiments.

The First Embodiment

Figure 1:
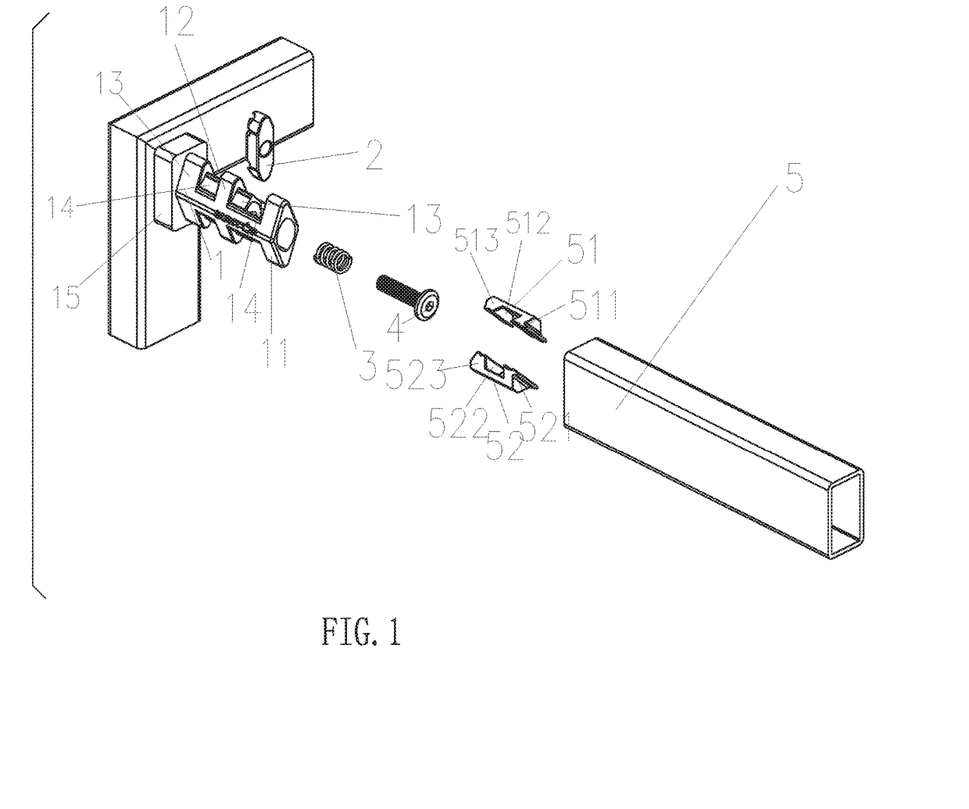
FIG. 1 illustrates an exploded and schematic diagram of a preferred embodiment of the present invention.

Referring to FIG. 1, a lock fixing mechanism with quick assembly and disassembly comprises:

a lock fixing mechanism main body 1, the main body 1 is disposed with a front end portion 11 and a first boss 12, the front end portion 11 is connected to the central portion of a side surface of the first boss 12; a chamber 14 is formed between the front end portion 11 and the first boss 12; in this embodiment, the section of the front end portion 11 and the first boss 12 in the direction vertical to the assembly direction are rhombus shaped with same size.

A position lock block 2, the position lock block 2 is disposed in the chamber 14; one side of the position lock block 2 near the first boss 12 is disposed with a first groove 21 and a second groove 22, the first groove 21 and the second groove 22 are symmetrical about the center; in this embodiment, the first groove 21 and the second groove 22 are of same size and shape, they are incline groove bars with height difference.

An elastic device 3, a spring preferred. The elastic device 3 is disposed in one side of the position lock block 2 near the front end portion 11, the elastic device 3 is deformable;

A lock fixing connector 5, the lock fixing connector 5 is disposed with a first position lock bar 51 and a second position lock bar 52 at the inner side, in this embodiment, the inner side of the lock fixing connector 5 is rectangle shaped, the long side of the rectangle is corresponding to the long shaft of the rhombus, the short side of the rectangle is corresponding to the short shaft of the rhombus. The first position lock bar 51 and the second position lock bar 52 are disposed at the same plane and symmetrically arranged about the center; one side of the first position lock bar 51 away from the front end portion 11 along the assembly direction is disposed with a first lock fixing component 511; one side of the second position lock bar 52 away from the front end portion 11 along the assembly direction is disposed with a second lock fixing component 521;

The length of the first lock fixing component 511 and the second lock fixing component 521 along the arrangement direction of the front end portion 11 and the first boss 12 is larger than the distance between the position lock block 2 and the first boss 12; the length of the first lock fixing component 511 and the second lock fixing component 521 along the arrangement direction of the front end portion 11 and the first boss 12 is smaller than the distance between the position lock block 2 and the first boss 12 when the elastic device 3 is compressed to the shortest.

Figure 3A:
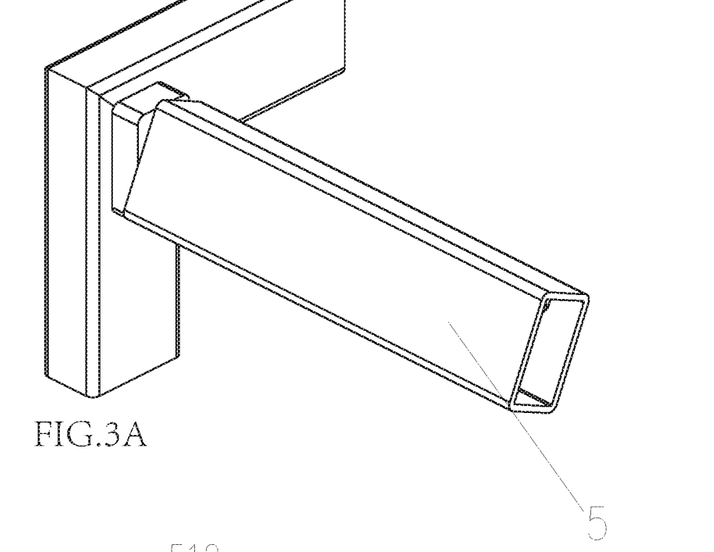
FIG. 3A illustrates a schematic diagram of the present invention in assembling step 1.
Figure 3B:
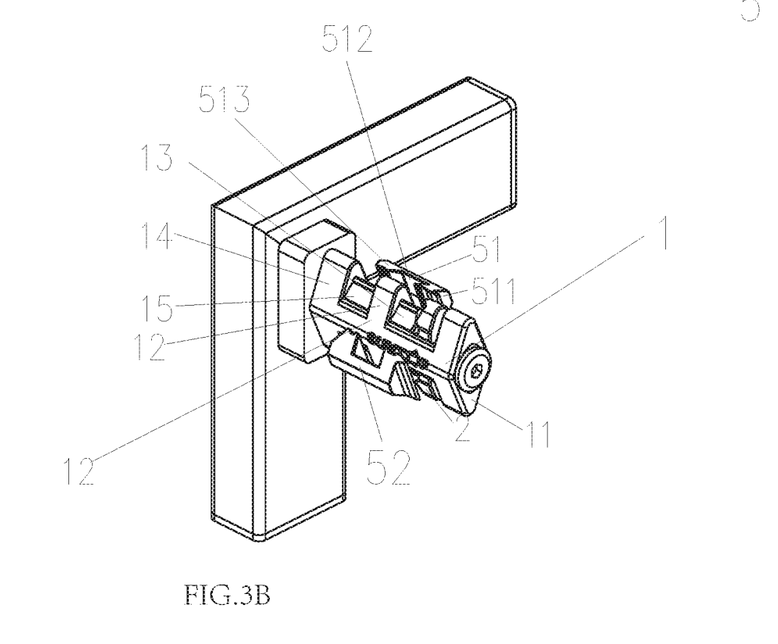
FIG. 3B illustrates a perspective diagram of the present invention in assembling step 1.
Figure 4A:
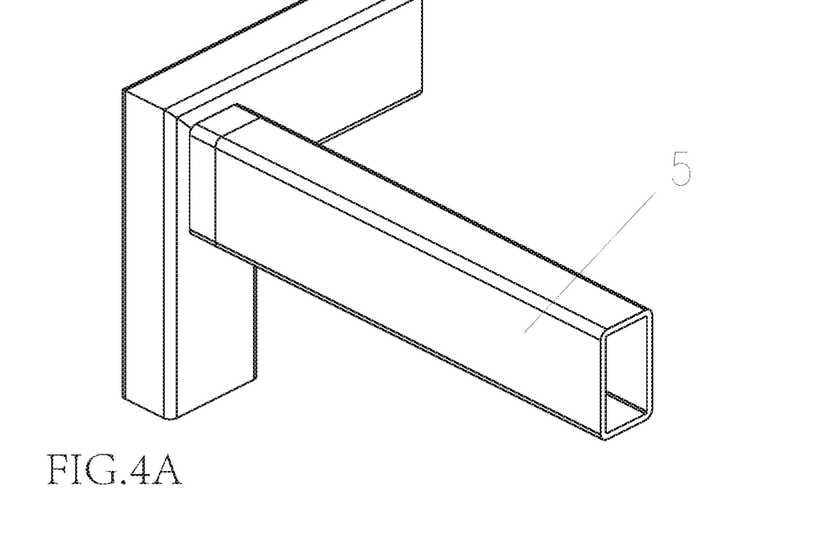
FIG. 4A illustrates a schematic diagram of the present invention in assembling step 2.
Figure 4B:
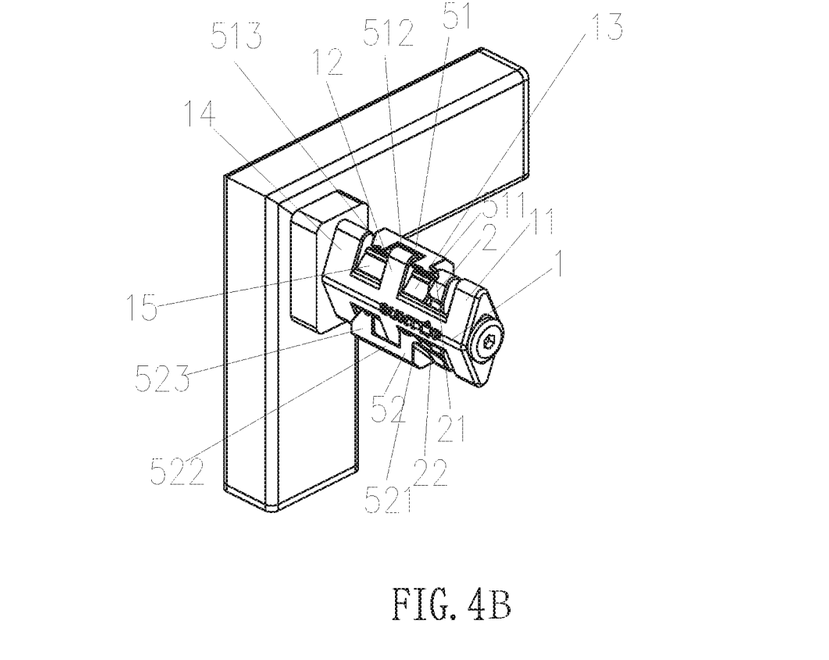
FIG. 4B illustrates a perspective diagram of the present invention in assembling step 2.

Referring to FIG. 3 and FIG. 4, the lock fixing connector 5 is sleeved on the lock fixing mechanism main body 1, the first lock fixing component 511 and the second lock fixing component 521 are contacted at the outer side of the position lock block 2; when the lock fixing connector 5 rotates, the first lock fixing component 511 and the second lock fixing component 521 squeeze the position lock bar 2, the elastic device 3 is compressed, the position lock bar 2 moves towards the deforming direction of the elastic device 3; when the first lock fixing component 511 and the second lock fixing component 521 coincide with the first groove 21 and the second groove 22, the position lock bar 2 rebounds by the elastic device 3, making the first lock fixing component 511 and the second lock fixing component 521 locked to the first groove 21 and the second groove 22 to finish the lock. At the same time, the first lock groove 512 and the second lock groove 522 are respectively locked to the upper half portion and the lower half portion of the first boss 12, thus finishing the lock fixing of the entire device. After the lock fixing, four vertexes of the front end portion 11 and the first boss 12 respectively abut against the inner wall of the lock fixing connector 5, the entire device is solid, the bearing effect is better. When being disassembled, it just needs to rotate the lock fixing connector reversely, the first lock fixing component 511 and the second lock fixing component 521 rebound from the first groove 21 and the second groove 22 that the device is disassembled.

In this embodiment, the lock fixing mechanism main body 1 is fixedly connected to a base 15 that it is convenient to weld the main body 1 to any position it is needed.

The Second Embodiment

Referring to FIG. 1, this embodiment differs from the first embodiment in that: the position lock block 2 and the elastic device 3 are assembled between the front end portion 11 and a first guiding device 13 by a screw 4, so that the position lock block 2 and the elastic device 3 would not move in the vertical direction.

The rest portion of this embodiment is similar to the first embodiment that it would not be further described.

The Third Embodiment

Referring to FIG. 1, this embodiment differs from the second embodiment in that: one end of the first lock groove 512 away from the first lock fixing component 511 is disposed with a first guiding block 513. One end of the second lock groove 522 away from the second lock fixing component 521 is further disposed with a second guiding block 523. At the same time, the main body 1 is further disposed with a first guiding device 13 and a third boss 14. The first guiding device 13 is disposed between the position lock block 2 and the first boss 12 and is fixedly connected to the first boss 12. The third boss 14 is connected to the central portion of the side surface of the first boss 12; a second guiding device 15 is disposed between the third boss 14 and the second boss 12.

With the first guiding block 513, the second guiding block 523 and the first guiding device 13, the second guiding device 15, when the movable connector 5 is sleeved on the main body 1, it is more easy and smooth.

The reset portion of this embodiment is similar to the second embodiment that it would not be further described hereafter.

The Fourth Embodiment

Figure 2:
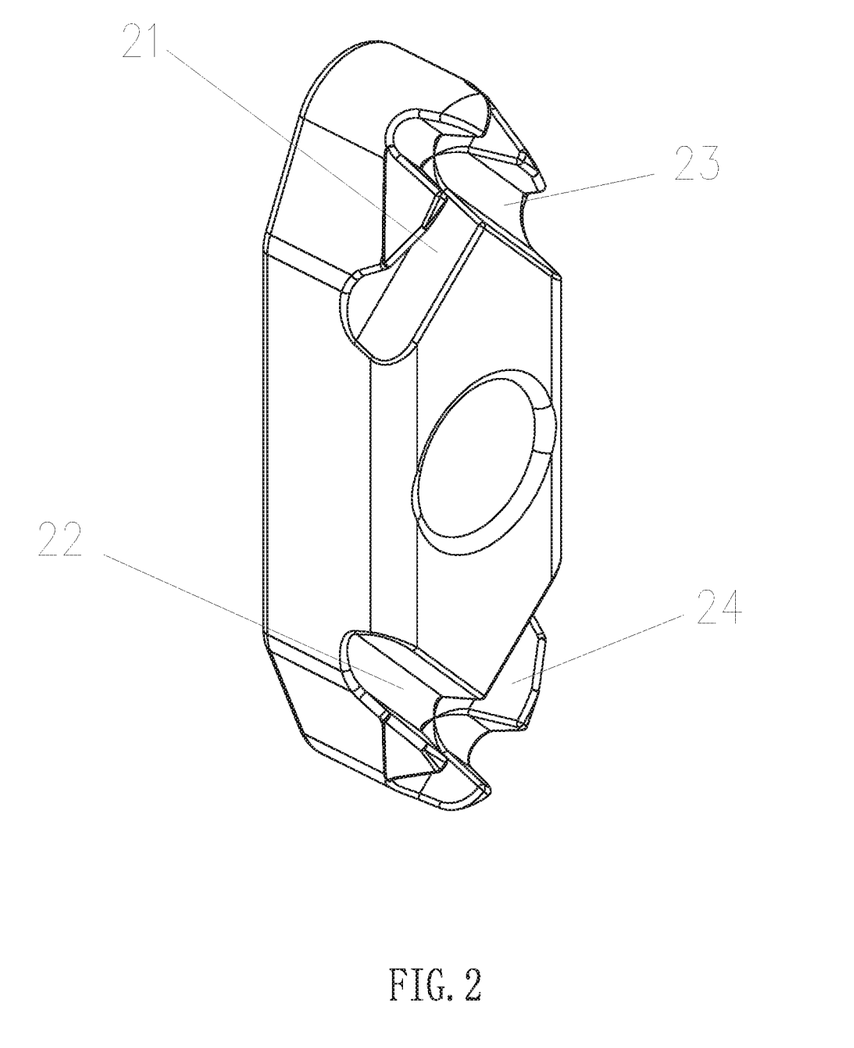
FIG. 2 illustrates a schematic diagram of the position lock block of present invention.

Referring to FIG. 2, this embodiment differs form the first embodiment in that: one side of the position lock block 2 near the first boss 12 is further disposed with a third groove 23 and a fourth groove 24, the third groove 23 and the first groove 21 are symmetrically arranged in the vertical direction; the fourth groove 24 and the second groove 22 are symmetrically arranged in the vertical direction.

With the third groove 23 and the fourth groove 24, the movable connector 5 can be locked by rotating in the clockwise direction or in the counter-clockwise direction that the practicability of the present invention is improved.

The Fifth Embodiment

Figure 5:
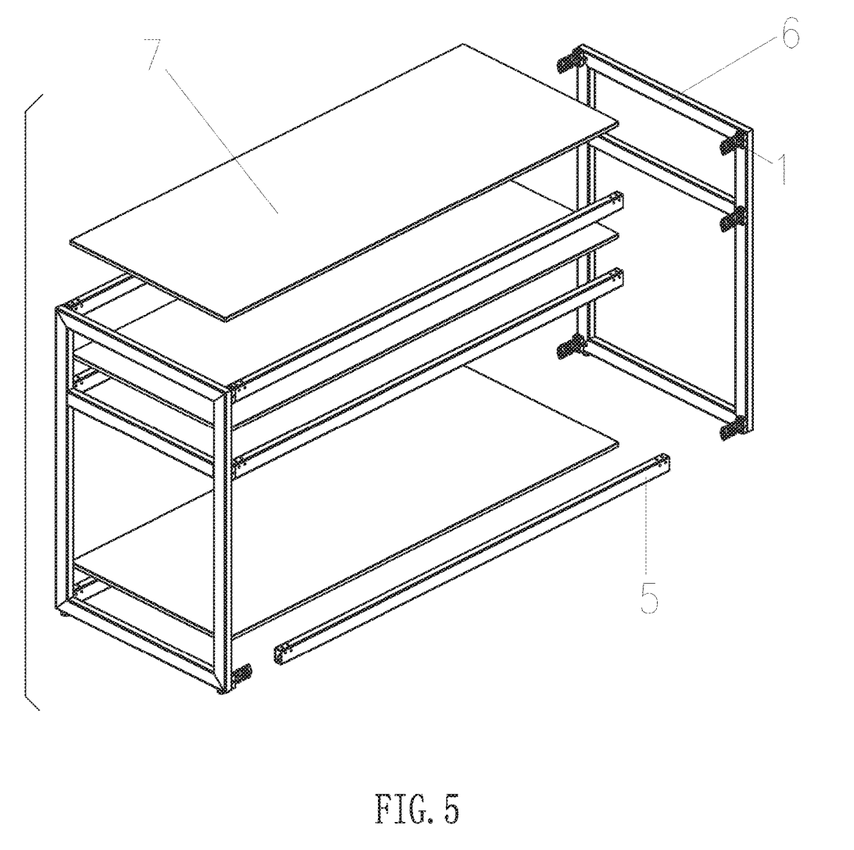
FIG. 5 illustrates a schematic diagram of a booth of the present invention.

Referring to FIG. 5, a booth applied with above mentioned lock fixing mechanism with quick assembly and disassembly comprises a lock fixing connector 5, a connecting frame 6 and a glass table top. The booth comprises two connecting frames 6 that are arranged in the opposite direction, two connecting frames 6 are welded with lock fixing mechanism main bodies 1 at the corresponding positions; two ends of the lock fixing connector 5 are respectively fixed with the first position lock bar 51 and the second position lock bar 52.

When assembling, one end of the lock fixing connector 5 is sleeved on the lock fixing mechanism main body 1 of one connecting frame 6. the lock fixing mechanism main body 1 of the other connecting frame 6 is inserted to the other end of the lock fixing connector 5. Then the lock fixing connectors are rotated to finish the lock fixing. The glass table top is then placed in the booth, the assembling is finished.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a lock fixing device with quick assembly and disassembly, when to assemble it just needs to make the movable connector sleeved on the lock fixing mechanism main body and then rotated that it can achieve the connecting of the lateral pipe and the longitudinal pipe. When to disassemble, it just needs to rotate the movable connector reversely. It doesn't need professional nor additional tools, it is convenient to quick assemble a booth and a shelf.

The invention claimed is:
1. A lock fixing mechanism with quick assembly and disassembly, comprising:
   a lock fixing mechanism main body disposed with a front end portion and a first boss;
   a chamber formed between the front end portion and the first boss;
   a position lock block disposed in the chamber, a thickness of the position lock block along an arrangement direction of the front end portion and the first boss being smaller than a depth of the chamber along the arrangement direction of the front end portion and the first boss, and the position lock block being disposed with a first groove at a side near the first boss;
   an elastic device disposed at one side of the position lock block near the front end portion;
   a lock fixing connector disposed with a first position lock bar at an inner side, wherein
      the first position lock bar is disposed with a first lock fixing component at one side away from the first boss along an assembly direction, and is disposed with a first groove at one side away from the first lock fixing component,
      a length of the first lock fixing component along the arrangement direction of the front end portion and the first boss is larger than a distance between the position lock block and the first boss in a normal state,
      a length of the first lock fixing component along the arrangement direction of the front end portion and the first boss is smaller than the distance between the position lock block and the first boss when the elastic device is compressed to a shortest state;
   the lock fixing connector is sleeved on the lock fixing mechanism main body,
   the first lock fixing component contacts an outer side of the position lock block, when the lock fixing connector rotates, the first lock fixing component squeezes the position lock block, the elastic device is compressed, and the position lock block moves towards a deforming direction of the elastic device, and when the first lock fixing component coincides with the first groove, the position lock block rebounds due to the elastic device, making the first lock fixing component become locked to the first groove, and at a same time, the first groove is locked to an upper half portion of the first boss.

2. The lock fixing mechanism with quick assembly and disassembly according to claim 1, wherein the front end portion is a second boss with a same size and a same shape as the first boss.

3. The lock fixing mechanism with quick assembly and disassembly according to claim 1, wherein a section of the first boss vertical with respect to the assembly direction is rhombus shaped.

4. The lock fixing mechanism with quick assembly and disassembly according to claim 1, wherein a section of an internal surface of a movable connecting element vertical with respect to the assembly direction has a shape of a rectangle, a long side of the rectangle corresponding to a long axis of a rhombus, and a short side of the rectangle corresponding to a short axis of the rhombus.

5. The lock fixing mechanism with quick assembly and disassembly according to claim 1, wherein the first groove is an incline groove bar with a height difference.

6. The lock fixing mechanism with quick assembly and disassembly according to claim 1, wherein one side of the position lock block near the first boss is disposed with a second groove with a same shape and a same size as the first groove, and the second groove and the first groove are symmetrical about a center.

7. The lock fixing mechanism with quick assembly and disassembly according to claim 1, wherein one side of the position lock block near the first boss is disposed with a third groove and a fourth groove, the third groove and the first groove are symmetrically arranged in a longitudinal direction and the fourth groove and the second groove are symmetrically arranged in the longitudinal direction.

8. The lock fixing mechanism with quick assembly and disassembly according to claim 1, wherein one end of the first groove away from the first lock fixing component is disposed with a first guiding block.

9. The lock fixing mechanism with quick assembly and disassembly according to claim 1, wherein an internal portion of a movable connector is disposed with a second position lock bar, and the second position lock bar has a same size and a same shape as the first position lock bar and is assembled in a same longitudinal plane symmetrical with respect to the first position lock bar about a center.

10. The lock fixing mechanism with quick assembly and disassembly according to claim 1, wherein a first guiding device is disposed between the position lock block and the first boss, and the first guiding device is fixed to the first boss.

11. The lock fixing mechanism with quick assembly and disassembly according to claim 1, wherein the lock fixing mechanism main body is further disposed with a third boss, the third boss is connected to a central portion of a side surface of the first boss, and a second guiding device is disposed between the third boss and the first boss.

12. The lock fixing mechanism with quick assembly and disassembly according to claim 1, wherein the position lock block and the elastic device are connected between the front end portion and a first guiding device via a screw.

13. The lock fixing mechanism with quick assembly and disassembly according to claim 1, wherein the lock fixing mechanism is fixed to a base.

14. A booth, comprising:
the lock fixing mechanism with quick assembly and disassembly according to claim 1;
a connecting frame; and
two other connecting frames arranged oppositely, wherein the lock fixing mechanism main body is welded to a corresponding position of the two connecting frames, and two ends of the lock fixing connector are respectively fixed with the first position lock bar.

15. The booth according to claim 14, wherein the booth further comprises a glass table top.

16. A lock fixing method applied with the lock fixing mechanism according to claim 1, comprising:
1) disposing a fixing portion with a movable element, and disposing the elastic device between the movable element and the fixing portion, the movable element being disposed with a lock fixing groove;
2) disposing a connecting element, an internal portion of the connecting element disposed with a lock fixing device corresponding to the lock fixing groove;
3) sleeving the connecting element on the fixing portion, and bringing the lock fixing device into contact with an outer side of the movable element;
4) rotating the connecting element to make the lock fixing device squeeze the movable element to push the movable element to move, when the lock fixing device rotates to a position coinciding with the lock fixing groove, the movable element rebounding by a spring device to finish fixing of the lock fixing device; and
5) when the lock fixing device is to be disassembled, rotating the connecting element reversely.

17. A lock fixing mechanism with quick assembly and disassembly, comprising:
a lock fixing mechanism main body disposed at a side outer wall of a lateral pipe, with a front end portion and a first boss;
a chamber formed between the front end portion and the first boss;
a position lock block disposed in the chamber and being movable between the front end portion and the first boss;
an elastic device abutting between the position lock block and the front end portion;
a lock fixing connector disposed in an inner wall of a longitudinal pipe, the lock fixing connector being sleeved on the lock fixing mechanism main body;
wherein when the lock fixing connector is rotated, the lock fixing connector squeezes the position lock block, the elastic device is compressed, and the position lock block moves towards the front end portion; and
when the lock fixing connector moves to a position, the position lock block is pushed by the elastic device to lock the lateral pipe and the longitudinal pipe;
and wherein:
the position lock block is disposed with a first groove at one side near to the first boss;
the lock fixing connector is disposed with a first position lock bar, and one side of the first position lock bar, away from the first boss along an assembly direction is a first lock fixing component;
one end of the first position lock bar away from the first lock fixing component is disposed with a first groove;

a length of the first lock fixing component along an arrangement direction of the front end portion and the first boss is larger than a distance between the position lock block and the first boss in a normal state; and a length of the first lock fixing component along the arrangement direction of the front end portion and the first boss is smaller than a distance between the position lock block and the first boss when the elastic device is compressed to a shortest state.

18. The lock fixing mechanism with quick assembly and disassembly according to claim 17, wherein:
   the lock fixing connector is sleeved on the lock fixing mechanism main body;
   the first lock fixing component contacts an outer side of the position lock block;
   when the lock fixing connector rotates, the first lock fixing component squeezes the position lock block, the elastic device is compressed, and the position lock block moves towards a deforming direction of the elastic device; and
   when the first lock fixing component coincides with the first groove, the position lock block rebounds due to the elastic device, making the first lock fixing component become locked to the first groove, and at a same time, the first groove is locked to an upper half portion of the first boss.

19. The lock fixing mechanism with quick assembly and disassembly according to claim 17, wherein a section of the first boss vertical with respect to the assembly direction is rhombus shaped.

20. The lock fixing mechanism with quick assembly and disassembly according to claim 19, wherein a section of an internal surface of a longitudinal pipe vertical with respect to the assembly direction is rectangle shaped, a long side of a rectangle corresponds to a long axis of a rhombus, and a short side of the rectangle corresponds to a short axis of the rhombus.

21. The lock fixing mechanism with quick assembly and disassembly according to claim 20, wherein the first groove is an incline groove bar with a height difference.

22. The lock fixing mechanism with quick assembly and disassembly according to claim 21, wherein one side of the position lock block near the first boss is disposed with a second groove symmetrical with respect to the first groove about a center.

23. The lock fixing mechanism with quick assembly and disassembly according to claim 22, wherein the one side of the position lock block near the first boss is further disposed with a third groove and a fourth groove, the third groove and the first groove are symmetrically arranged in a longitudinal direction; and the fourth groove and the second groove are symmetrically arranged in the longitudinal direction.

24. The lock fixing mechanism with quick assembly and disassembly according to claim 17, wherein one end of the first groove away from the first lock fixing component is disposed with a first guiding block.

25. The lock fixing mechanism with quick assembly and disassembly according to claim 17, wherein an internal portion of a movable connector is disposed with a second position lock bar, and the second position lock bar has a same size and a same shape as the first position lock bar and is assembled in a same longitudinal plane symmetrical with respect to the first position lock bar about a center.

* * * * *